United States Patent
Jang et al.

(10) Patent No.: US 10,340,493 B2
(45) Date of Patent: Jul. 2, 2019

(54) SEPARATOR FOR RECHARGEABLE BATTERY AND RECHARGEABLE BATTERY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Jungsue Jang, Suwon-si (KR); Minho Cho, Suwon-si (KR); Sung Soo Han, Hwaseong-si (KR); Hana Kim, Suwon-si (KR); Byungmin Lee, Suwon-si (KR); Jun Hyuk Moon, Daejeon (KR); Myungkook Park, Suwon-si (KR); Seungrim Yang, Seongnam-si (KR); Hyoungwoo Choi, Hwaseong-si (KR)

(73) Assignees: Smasung SDI Co., Ltd., Yongin-Si, Gyeonggi-do (KR); Samsung Electronics Co., Ltd., Suwon-Si, Gyeonggi-do (KR)

( * ) Notice: Subject to any disclaimer, the term of this patent is extended or adjusted under 35 U.S.C. 154(b) by 227 days.

(21) Appl. No.: 15/338,496

(22) Filed: Oct. 31, 2016

(65) Prior Publication Data
US 2017/0133652 A1 May 11, 2017

(30) Foreign Application Priority Data
Nov. 5, 2015 (KR) .......................... 10-2015-0155248

(51) Int. Cl.
| | | |
|---|---|---|
| H01M 2/16 | (2006.01) | |
| H01M 10/0525 | (2010.01) | |
| C09D 5/00 | (2006.01) | |
| C09D 7/40 | (2018.01) | |
| C09D 7/61 | (2018.01) | |
| C09D 7/65 | (2018.01) | |
| C08K 3/22 | (2006.01) | |
| C08K 3/34 | (2006.01) | |

(52) U.S. Cl.
CPC ............ *H01M 2/1686* (2013.01); *C09D 5/00* (2013.01); *C09D 7/61* (2018.01); *C09D 7/65* (2018.01); *C09D 7/68* (2018.01); *H01M 2/166* (2013.01); *C08K 3/22* (2013.01); *C08K 3/34* (2013.01); *H01M 2/1646* (2013.01); *H01M 2/1653* (2013.01); *H01M 10/0525* (2013.01)

(58) Field of Classification Search
CPC ............ H01M 2/1686; H01M 2/1653; H01M 2/1646; H01M 2/166; H01M 10/0525; C08K 3/22; C08K 3/34; C09D 7/65; C09D 7/61; C09D 7/68; C09D 5/00
See application file for complete search history.

(56) References Cited

U.S. PATENT DOCUMENTS

| | | | |
|---|---|---|---|
| 2014/0137399 A1* | 5/2014 | Sanami ................. | H01M 2/145 29/623.1 |
| 2014/0272532 A1* | 9/2014 | Park ...................... | H01M 2/166 429/144 |

FOREIGN PATENT DOCUMENTS

| | | |
|---|---|---|
| CN | 103066231 A | 4/2013 |
| JP | 2012-248408 A | 12/2012 |
| KR | 10-2012-0121623 A | 11/2012 |
| KR | 10-1198493 B1 | 11/2012 |
| KR | 10-2013-0054004 A | 5/2013 |
| KR | 10-1327891 B1 | 11/2013 |
| KR | 10-1396270 B1 | 5/2014 |
| KR | 10-2014-0136807 A | 12/2014 |

OTHER PUBLICATIONS

Machine translation of KR 10-1198493 (cited on IDS) (Year: 2012).*

* cited by examiner

*Primary Examiner* — Eugenia Wang
(74) *Attorney, Agent, or Firm* — Lee & Morse, P.C.

(57) ABSTRACT

A separator for a rechargeable battery includes a porous substrate and a heat-resistant layer disposed on at least one surface of the porous substrate, wherein the heat-resistant layer includes a compound represented by Chemical Formula 1 or a cross-linked product thereof and a rechargeable lithium battery includes the same.

$(R)_{n1}$—Ar—OH  [Chemical Formula 1]

In Chemical Formula 1, Ar, R, and n1 are the same as described in the detailed description.

16 Claims, 1 Drawing Sheet

【FIG. 1】
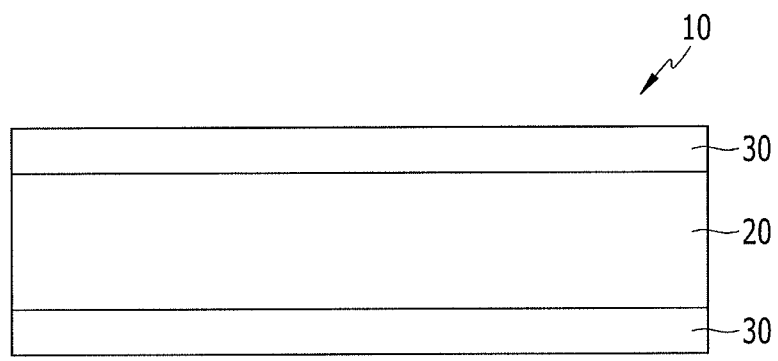
【FIG. 2】
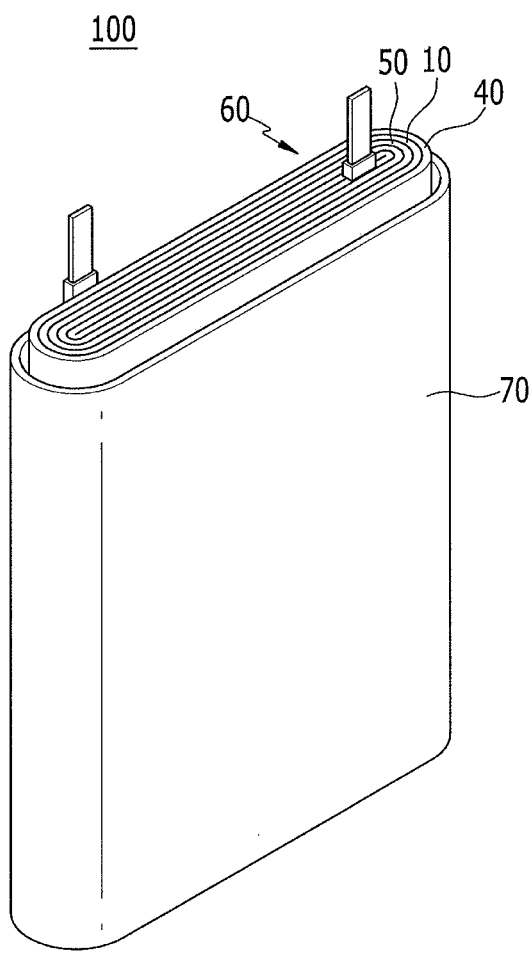

SEPARATOR FOR RECHARGEABLE BATTERY AND RECHARGEABLE BATTERY INCLUDING THE SAME

CROSS-REFERENCE TO RELATED APPLICATION

Korean Patent Application No. 10-2015-0155248, filed on Nov. 5, 2015, in the Korean Intellectual Property Office, and entitled: "Separator for Rechargeable Battery and Rechargeable Battery Including the Same," is incorporated by reference herein in its entirety.

BACKGROUND

1. Field

A separator for a rechargeable battery and a rechargeable lithium battery including the same are disclosed.

2. Description of the Related Art

A separator for an electrochemical battery is an intermediate film that separates a positive electrode and a negative electrode in a battery. The separator maintains ion conductivity continuously to enable charge and discharge of a battery.

SUMMARY

Embodiments are directed to a separateor for a rechargeable battery including a porous substrate and a heat-resistant layer on at least one surface of the porous substrate. The heat-resistant layer includes a compound represented by Chemical Formula 1 or a cross-linked product thereof:

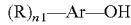   [Chemical Formula 1]

wherein, in Chemical Formula 1, Ar is a C6 to C20 aryl group, n1 is an integer ranging from 5 to 19, the Rs are the same or different and are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50cycloalkyl group, a substituted or unsubstituted C3 to C50 cycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof, and at least one R is a substituted or unsubstituted C2 to C50 alkenyl group.

The compound represented by Chemical Formula 1 may be a compound represented by Chemical Formula 1a:

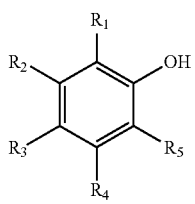   [Chemical Formula 1a]

wherein, in Chemical Formula 1a, $R_1$ to $R_5$ are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50 cycloalkyl group, a substituted or unsubstituted C3 to C50 cycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof, and at least one of $R_1$ to $R_5$ is a substituted or unsubstituted C2 to C50 alkenyl group.

At least one of $R_1$ to $R_5$ of Chemical Formula 1a may be a hydroxy group.

$R_1$ of Chemical Formula 1a may be a hydroxy group.

$R_5$ of Chemical Formula 1a may be a substituted or unsubstituted C2 to C50 alkenyl group.

The heat-resistant layer may include the cross-linked product of the compound represented by Chemical Formula 1. The cross-linked product of the compound represented by Chemical Formula 1 may have a weight average molecular weight of about 1,000 g/mol to about 50,000 g/mol.

The heat-resistant layer may further include at least one of a cross-linkable compound differing from the compound represented by Chemical Formula 1 and a non-cross-linkable compound.

The heat-resistant layer may further include polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxymethyl cellulose, an acrylonitrile-styrene-butadiene copolymer, or a combination thereof.

The heat-resistant layer may further include an inorganic filler, an organic filler, an organic/inorganic filler, or a combination thereof.

The heat-resistant layer includes the inorganic filler. The inorganic filler may be or include a metal oxide, a semi-metal oxide, a metal fluoride, a metal hydroxide, or a combination thereof. The heat-resistant layer includes the organic filler. The organic filler may be or include an acrylic compound, an imide compound, an amide compound, or a combination thereof.

The heat-resistant layer may include the inorganic filler. The inorganic filler may be or include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, $Mg_3(OH)_2Si_4O_{10}$, or a combination thereof.

The porous substrate may include a polyolefin.

The porous substrate may include a single layer or two or more layers.

Embodiments are also directed to a rechargeable lithium battery including a positive electrode, a negative electrode, and the separator as described above between the positive electrode and the negative electrode.

BRIEF DESCRIPTION OF THE DRAWINGS

Features will become apparent to those of skill in the art by describing in detail exemplary embodiments with reference to the attached drawings in which:

FIG. 1 illustrates a view of a separator for a rechargeable battery according to an embodiment, and FIG. 2 illustrates an exploded perspective view of a rechargeable lithium battery according to an embodiment.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, when a definition is not otherwise provided, the term 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroarylalkyl group, a C3 to C20 cycloalkyl group, a C3 to C20 cycloalkenyl group, a C4 to C20 cycloalkynyl group, a C2 to C20 heterocycloalkyl group, and a combination thereof.

As used herein, when specific definition is not otherwise provided, "hetero" refers to one including 1 to 3 hetero atoms selected from N, O, S, and P, and remaining carbons in one compound or substituent.

In the present specification, "aryl group" refers to a group including at least one hydrocarbon aromatic moiety, and includes carbocyclic aromatic moieties linked by a single bond and carbocyclic aromatic moieties fused directly or indirectly to provide a non-aromatic fused ring. The aryl group may include a monocyclic, polycyclic or fused polycyclic (i.e., rings sharing adjacent pairs of carbon atoms) functional group.

In the present specification, "heterocyclic group" may refer to a cyclic compound such as an aryl group, a cycloalkyl group, a fused ring thereof, or a combination thereof including at least one hetero atom selected from N, O, S, P, and Si and remaining carbon. When the heterocyclic group is a fused ring, an entire ring or each ring of the heterocyclic group may include at least one hetero atom.

Hereinafter, a separator for a rechargeable battery according to an embodiment is described.

FIG. 1 illustrates a view of a separator for a rechargeable battery according to an embodiment.

Referring to FIG. 1, a separator 10 for a rechargeable battery according to an embodiment includes a porous substrate 20 and a heat-resistant layer 30 disposed on one surface or both surfaces of the porous substrate 20.

The porous substrate 20 may have a plurality of pores and may generally be a porous substrate used in an electrochemical device. Examples of the porous substrate 20 may be a polymer film formed of a polymer or a mixture of two or more a polyolefin such as polyethylene or polypropylene, a polyester such as polyethyleneterephthalate or polybutyleneterephthalate, a polyacetal, a polyamide, a polyimide, a polycarbonate, a polyetheretherketone, a polyaryletherketone, a polyetherimide, a polyamideimide, a polybenzimidazole, a polyethersulfone, a polyphenyleneoxide, a cyclic olefin copolymer, a polyphenylenesulfide, a polyethylenenaphthalate, a glass fiber, TEFLON (tetrafluoroethylene), and polytetrafluoroethylene (PTFE). For example, the porous substrate 20 may be a polyolefin-based substrate. The polyolefin-based substrate may provide improved safety of a battery due to an improved shut-down function. The polyolefin-based substrate may be, for example, selected from a polyethylene single film, a polypropylene single film, a polyethylene/polypropylene double film, a polypropylene/polyethylene/polypropylene triple film, and a polyethylene/polypropylene/polyethylene triple film. The polyolefin-based substrate may include a olefin resin and a non-olefin resin in addition to an olefin resin or may include a copolymer of olefin and a non-olefin monomer.

The porous substrate 20 may have a thickness of about 1 μm to about 40 μm, or, for example, about 1 μm to about 30 μm, about 1 μm to about 20 μm, about 5 μm to about 15 μm, or about 5 μm to about 10 μm.

The heat-resistant layer 30 may include a binder.

The binder may include a compound represented by Chemical Formula 1 and/or a cross-linked product thereof.

  [Chemical Formula 1]

In Chemical Formula 1, Ar is a C6 to C20 aryl group, n1 is an integer ranging from 5 to 19, the Rs are the same or different and are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50 cycloalkyl group, a substituted or unsubstituted C3 to C50 cycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof, at least one of R is a substituted or unsubstituted C2 to C50 alkenyl group.

Ar may be, for example, a phenyl group, a biphenyl group, a naphthyl group, a terphenyl group, an anthracenyl group, a phenanthryl group, a naphthacenyl group, or a pyrenyl group.

The Rs may be the same or different and may independently be, for example, hydrogen, a substituted or unsubstituted C1 to C50 alkyl group, a substituted or unsubstituted C2 to C50 alkenyl group, a halogen atom, or a hydroxy group.

At least one R may be a substituted or unsubstituted C2 to C50 alkenyl group. For example, at least one R may be a substituted or unsubstituted C5 to C50 alkenyl group. For example, at least one R may be a substituted or unsubstituted C10 to C50 alkenyl group. For example, at least one of R may be one of groups of Group 1.

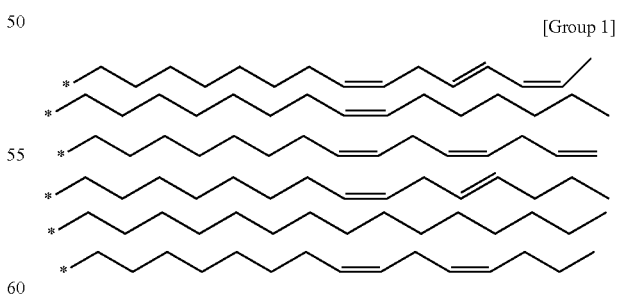

[Group 1]

In Group 1, * indicates a linking point with Ar of Chemical Formula 1.

The compound represented by Chemical Formula 1 may include at least one hydroxy group. Thus, the compound represented by Chemical Formula 1 may provide sufficient adherence so as to adhere the heat-resistant layer to the porous substrate 20 and/or an electrode and further increase heat resistance through a cross-linking reaction by at least one cross-linkable functional group.

The compound represented by Chemical Formula 1 may be, for example, a compound represented by Chemical Formula 1a.

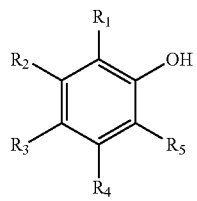

[Chemical Formula 1a]

In Chemical Formula 1a, $R_1$ to $R_5$ are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50 cycloalkyl group, a substituted or unsubstituted C3 to C50 cycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof, and at least one of $R_1$ to $R_5$ is a substituted or unsubstituted C2 to C50 alkenyl group.

For example, in Chemical Formula 1a, at least one of $R_1$ to $R_5$ may be a hydroxy group. Thus, the compound may have at least two hydroxy groups.

For example, in Chemical Formula 1a, $R_1$ may be a hydroxy group.

For example, in Chemical Formula 1a, at least one of $R_1$ to $R_5$ may be a substituted or unsubstituted C2 to C50 alkenyl group.

For example, in Chemical Formula 1a, $R_1$ may be a hydroxy group and at least one of $R_2$ to $R_5$ may be a substituted or unsubstituted C2 to C50 alkenyl group.

For example, in Chemical Formula 1a, $R_1$ may be a hydroxy group and $R_5$ may be a substituted or unsubstituted C2 to C50 alkenyl group.

For example, in Chemical Formula 1a, $R_1$ may be a hydroxy group, $R_5$ may be a substituted or unsubstituted C2 to C50 alkenyl group, and each of $R_2$ to $R_4$ may be hydrogen.

The cross-linked product of the compound represented by Chemical Formula 1 may have a weight average molecular weight of about 1,000 g/mol to about 50,000 g/mol, or, for example, about 5,000 g/mol to about 30,000 g/mol or, for example, about 10,000 g/mol to about 20,000 g/mol.

The binder may include one or more of the compound represented by Chemical Formula 1 and/or cross-linked products.

The binder may further include other compounds in addition to the compound represented by Chemical Formula 1 and/or a cross-linked product thereof. When the binder includes another compound in addition to the compound represented by Chemical Formula 1 and/or a cross-linked product thereof, the compound represented by Chemical Formula 1 and/or a cross-linked product thereof is referred to herein as a "first binder" and the other compound is referred to herein as "second binder." The second binder may be, for example, a cross-linkable compound other than the compound represented by Chemical Formula 1 and/or a cross-linked product thereof. The second binder may be or may include a non-cross-linkable compound.

The second binder may further include, for example, polyvinylidenefluoride (PVdF), a polyvinylidenefluoride-hexafluoropropylene (PVdF-HFP), polyvinylidenefluoride-trichloroethylene, polymethylmethacrylate, polyacrylonitrile, polyvinylpyrrolidone, polyvinylacetate, polyvinylalcohol, a polyethylene-vinylacetate copolymer, polyvinylether, polyethyleneoxide, polyimide, polyamic acid, polyamideimide, aramid, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethylcellulose, an acrylonitrile-styrene-butadiene copolymer, or a combination thereof.

When the first binder and the second binder are included together, the first binder and the second binder may be included in a weight ratio of about 1:9 to about 9:1, or, for example, about 8:2 to about 2:8, about 7:3 to about 3:7, or about 6:4 to about 4:6.

The binder may be included in an amount of about 1 wt % to about 80 wt %, or, for example, about 3 wt % to about 70 wt % or about 5 wt % to about 50 wt % based on the total amount of the heat-resistant layer 30.

The heat-resistant layer 30 may further include a filler.

The filler may be an inorganic filler, an organic filler, an organic/inorganic filler, or a combination thereof.

The inorganic filler may be a ceramic material capable of improving heat resistance. For example, the inorganic filler may be a metal oxide, a semi-metal oxide, a metal fluoride, a metal hydroxide, or a combination thereof. The inorganic filler may be, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, $Mg_3(OH)_2Si_4O_{10}$, or a combination thereof.

The organic filler may include an acrylic compound, an imide compound, an amide compound, or a combination thereof, as examples. The organic filler may have a core-shell structure, as an example.

The filler may have a particle or plate-shape having a size of about 1 nm to about 2,000 nm, or, for example, about 100 nm to about 1,000 nm, or, for example, about 100 nm to about 500 nm. Herein, the term "size" refers to an average particle diameter or a longest diameter. When the filler has a size within the range, the heat-resistant layer 30 may have a desirable strength.

The filler may be formed by mixing two or more different kinds of fillers or two or more fillers having different sizes.

The filler may be included in an amount of about 30 wt % to about 95 wt %, or for example, in an amount of about 60 wt % to about 90 wt % based on the total weight of the heat-resistant layer 30.

The filler may further improve heat resistance and thus may prevent a separator from being sharply contracted or transformed as a temperature is increased.

The heat-resistant layer 30 may be about 0.01 μm to about 20 μm thick, or, for example, about 1 μm to about 10 μm, or, for example, about 1 μm to about 5 μm.

The separator for a rechargeable battery may be formed, for example, by coating a heat-resistant composition onto one surface or onto both surfaces of the porous substrate 20 and then drying the coated heat-resistant composition.

The heat-resistant composition may include the binder, the filler, and a solvent. The solvent may be solvent suitable that dissolves or disperses the binder and the filler. For example, the solvent may be an alcohol such as methanol, ethanol, or isopropylalcohol, dimethyl formamide, dimethyl acetamide, tetramethylurea, triethylphosphate, N-methyl-2- pyrrolidone, dimethylsulfoxide, acetone, methylethylketone, methylisobutylketone, cyclohexanone, or a combination thereof.

The coating may be performed, for example, by spin coating, dip coating, bar coating, die coating, slit coating, roll coating, inkjet printing, or the like.

The drying may be performed, for example, by drying with warm air, hot air, or low humid air, vacuum-drying, or radiation of a far-infrared ray, an electron beam, or the like. The drying may be, for example, performed at about 25° C. to about 120° C.

In some implementations, the separator for a rechargeable battery may be formed using a method of lamination, co-extrusion, or the like.

Hereinafter, a rechargeable lithium battery including the separator for a rechargeable battery is described.

A rechargeable lithium battery may be classified into a lithium ion battery, a lithium ion polymer battery, and a lithium polymer battery depending on kind of separator and electrolyte. The rechargeable lithium battery may be classified as cylindrical, prismatic, coin-type, pouch-type, or the like depending on shape. In addition, the rechargeable lithium battery may be a bulk type and a thin film type depending on its size.

Herein, a prismatic rechargeable lithium battery as an example of a rechargeable lithium battery is explained.

FIG. 2 illustrates an exploded partial perspective view of a rechargeable lithium battery according to an embodiment.

Referring to FIG. 2, a rechargeable lithium battery 100 according to an embodiment may include a wound electrode assembly 60 including a separator 10 interposed between a positive electrode 40 and a negative electrode 50, and a case 70 housing the electrode assembly 60.

The electrode assembly 60 may be formed by interposing a separator 10 between the positive electrode 40 and the negative electrode 50 and then winding the positive electrode 40, separator 10, and negative electrode 50 into a jelly-roll shape.

The positive electrode 40, the negative electrode 50, and the separator 10 may be impregnated in an electrolyte solution. The case 70 may be sealed.

The positive electrode 40 may include a positive current collector and a positive active material layer formed on the positive current collector. The positive active material layer may include a positive active material, a binder, and optionally, a conductive material.

The positive current collector may include aluminum (Al), nickel (Ni), or the like, as examples.

The positive active material may include a compound being capable of intercalating and deintercalating lithium. For example, at least one of a composite oxide or a composite phosphate of a metal selected from cobalt, manganese, nickel, aluminum, iron, or a combination thereof and lithium may be used as the positive active material. For example, the positive active material may include lithium cobalt oxide, lithium nickel oxide, lithium manganese oxide, lithium nickel cobalt manganese oxide, lithium nickel cobalt aluminum oxide, lithium iron phosphate, or a combination thereof.

The binder may improve binding properties of positive active material particles with one another and with a current collector. Examples of a binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. These may be used singularly or as a mixture of two or more.

The conductive material may improve the conductivity of an electrode. Examples of the conductive material include natural graphite, artificial graphite, carbon black, a carbon fiber, a metal powder, a metal fiber, or the like. These may be used singularly or as a mixture of two or more. The metal powder and the metal fiber may include a metal of copper, nickel, aluminum, silver, or the like.

The negative electrode 50 may include a negative current collector and a negative active material layer formed on the negative current collector.

The negative current collector may include copper (Cu), gold (Au), nickel (Ni), a copper alloy, or the like.

The negative active material layer may include a negative active material, a binder and optionally a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material, for example, a generally-used carbon-based negative active material. Examples thereof include crystalline carbon, amorphous carbon, or a combination thereof. Examples of the crystalline carbon include graphite such as amorphous, sheet-shape, flake, spherical shape or fiber-shaped natural graphite or artificial graphite. Examples of the amorphous carbon include soft carbon (low temperature fired carbon) or hard carbon, a mesophase pitch carbonized product, fired coke, or the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ (0<x<2), a Si—C composite, a Si-Q alloy, Sn, $SnO_2$, a Sn—C composite, a Sn-Q, or the like. At least one of these may be mixed with $SiO_2$. Examples of the element Q may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. When the material capable of doping and dedoping lithium is Si-Q, Q is not Si. When the material capable of doping and dedoping lithium is Sn-Q, Q is not Sn. The transition metal oxide may be vanadium oxide, lithium vanadium oxide, or the like.

The binder and the conductive material used in the negative electrode may be the same as the binder and conductive material of the positive electrode.

The positive electrode 40 and the negative electrode 50 may be manufactured by mixing each active material composition including a corresponding active material and a binder, and optionally, a conductive material in a solvent, and coating the active material composition onto a respective current collector. The solvent may be N-methylpyrrolidone, or the like, as an example.

The separator 10 may be the same as described above.

The electrolyte solution may include an organic solvent and a lithium salt.

The organic solvent may serve as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent.

The carbonate based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether-based solvent may be dibutyl ether, tetraglyme, diglyme, dimethoxyethane, 2-methyltetrahydrofuran, tetrahydrofuran, or the like. The ketone-based solvent may be cyclohexanone, or the like. The alcohol-based solvent may be ethanol, isopropyl alcohol, or the like. The aprotic solvent may be a nitrile such as R—CN (where R is a C2 to C20 linear or branched or cyclic hydrocarbon group, a double bond, an aromatic ring, or an ether bond), or the like, an amides such as dimethyl formamide, an dioxolanes such as 1,3-dioxolane, a sulfolane, or the like.

The organic solvent may be used alone or in a mixture. When the organic solvent is used in a mixture, the mixture ratio can be controlled in accordance with a desirable battery performance.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers), LiCl, LiI, $LiB(C_2O_4)_2$, or a combination thereof.

The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery including the separator may be operated at a high voltage of greater than or equal to about 4.2 V. Thus, a rechargeable lithium battery having a high capacity may be provided without the deterioration of cycle life characteristics.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Separator

Preparation Example 1

A composition was prepared by mixing 0.833 g of Urushiol PU (The Nine Color Inc.), 0.833 g of polyvinylidenefluoride-hexafluoropropylene (PVdF-HFP) (KF9300, Kureha), and 13.333 g of $Al_2O_3$ (LS235A, KBM-503) in a mixed solvent of N,N-dimethyl acetamide (DMAc) and acetone. The composition included 15 wt % of a solid, 3 wt % of N,N-dimethyl acetamide, and 82 wt % of acetone.

The composition was dip-coated onto a 7 μm-thick polyethylene substrate (SK Innovation Co.) and then, dried at 110° C. for 1 minute to manufacture a separator.

Preparation Example 2

A separator was manufactured according to the same method as Preparation Example 1 except for using Urushiol YU (The Nine Color Inc.) instead of the Urushiol PU.

Comparison Preparation Example 1

A separator was manufactured according to the same method as Preparation Example 1 except for using 1.666 g of polyvinylidenefluoride-hexafluoropropylene (PVdF-HFP) instead of the Urushiol PU.

Comparison Preparation Example 2

A separator was manufactured according to the same method as Preparation Example 1 except for using an acryl binder (MU 9800, Miwon Specialty Chemical Co.) instead of the Urushiol PU.

Manufacture of Rechargeable Lithium Battery Cell

Example 1

A slurry was prepared by adding $LiCoO_2$, polyvinylidenefluoride, and carbon black in a weight ratio of 96:2:2 in an N-methylpyrrolidone (NMP) solvent. The slurry was coated onto an aluminum (Al) thin film and then dried and compressed to manufacture a positive electrode.

Another slurry was prepared by mixing graphite, polyvinylidenefluoride, and carbon black in a weight ratio of 98:1:1 in an N-methylpyrrolidone (NMP) solvent. The slurry was coated onto a copper foil (a Cu foil) and then dried and compressed to manufacture a negative electrode.

An electrolyte solution was prepared by mixing ethylene carbonate (EC), ethylmethyl carbonate (EMC), and diethyl carbonate (DEC) in a volume ratio 3:5:2 and adding 1.15 M of $LiPF_6$ in the mixed solvent.

The separator according to Preparation Example 1 was interposed between the positive and negative electrodes to obtain a jelly roll-shaped electrode assembly. Subsequently, the electrode assembly was fixed in a case without welding a lead tab. The case was sealed after injecting the electrolyte solution thereinto to manufacture a rechargeable lithium battery cell.

Example 2

A rechargeable lithium battery cell was manufactured according to the same method as Example 1 except for using the separator according to Preparation Example 2 instead of the separator according to Preparation Example 1.

Comparative Example 1

A rechargeable lithium battery cell was manufactured according to the same method as Example 1 except for using the separator according to Comparison Preparation Example 1 instead of the separator according to Preparation Example 1.

Comparative Example 2

A rechargeable lithium battery cell was manufactured according to the same method as Example 1 except for using the separator according to Comparison Preparation Example 2 instead of the separator according to Preparation Example 1.

Evaluation 1

The rechargeable lithium battery cells according to Examples 1 and 2 and Comparative Examples 1 and 2 were allowed to stand in a 150° C. oven for one hour. The electrode assemblies were then taken out therefrom and disassembled into the positive electrodes, the separators, and the negative electrodes.

Subsequently, the shrinkage rate of each of the separators in a machine direction (MD) was evaluated. The shrinkage rate of the separators was obtained by measuring a degree to which the separators shrank before and after a heat treatment in the oven.

The results are provided in Table 1.

TABLE 1

| | Shrinkage rate at a high temperature (%) |
|---|---|
| Example 1 | less than or equal to 2 |
| Example 2 | less than or equal to 2 |
| Comparative Example 1 | greater than or equal to 50 |
| Comparative Example 2 | less than or equal to 2 |

Referring to Table 1, the rechargeable lithium battery cells according to Examples 1 and 2 showed minimal shrinkage after the heat treatment at 150° C.

Evaluation 2

The rechargeable lithium battery cells according to Examples 1 and 2 and Comparative Examples 1 and 2 were allowed to stand in a 150° C. oven for one hour, and each electrode assembly therein was respectively taken out and disassembled into the positive electrode, the separator, and the negative electrode.

Subsequently, the areas of the positive and negative electrodes transferred into the separator were measured to evaluate adherence between the electrodes and the separator. The adherence between the electrodes and the separator was evaluated by a percentage of the transferred areas into the separator relative to the total area of the electrodes.

The results are provided in Table 2.

TABLE 2

| | Adherence (%) |
|---|---|
| Example 1 | 65.2 |
| Example 2 | 65.9 |
| Comparative Example 1 | 0 |
| Comparative Example 2 | 0 |

Referring to Table 2, the rechargeable lithium battery cells according to Examples 1 and 2 exhibited greater adherence between the electrodes and the separator compared with the rechargeable lithium battery cells according to Comparative Examples 1 and 2.

Evaluation 3

The rechargeable lithium battery cells according to Examples 1 and 2 and Comparative Examples 1 and 2 were constant current-charged at 45° C. with a current of a 1 C rate until a voltage reached 4.25 V and then, maintained for 10 minutes. Subsequently, the rechargeable lithium battery cells were discharged with a constant current of 1 C until the voltage reached 3.0 V and then, maintained for 15 minutes. The cycle was 300 times repeated.

The rechargeable lithium battery cells according to Examples 1 and 2 and Comparative Examples 1 and 2 all secured greater than or equal to 80% of capacity retention.

Accordingly, the rechargeable lithium battery cells according to Examples 1 and 2 secured equivalent battery characteristics to those of the rechargeable lithium battery cells according to Comparative Examples 1 and 2.

By way of summation and review, when shrinkage and expansion of a positive electrode and a negative electrode during charge and discharge cycles of a battery are repeated or when a battery is abnormally operated, exothermic heat may increase, and thus a battery temperature may be abruptly increased. In this case, a separator could abruptly contract or be destroyed and thereby, a short circuit between a positive electrode and a negative electrode could occur.

Embodiments provide a separator for a rechargeable battery capable of improving adherence to an electrode and providing high temperature stability. Embodiments also provide a rechargeable battery including the separator. The separator may be prevented from a shrinkage and deformation at a high temperature, and thus stability of the battery including the separator may be increased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A separator for a rechargeable battery, the separator comprising:
    a porous substrate, and
    a heat-resistant layer on at least one surface of the porous substrate
    wherein the heat-resistant layer includes a compound represented by Chemical Formula 1 or a cross-linked product thereof:

$(R)_{n1}$—Ar—OH  [Chemical Formula 1]

wherein, in Chemical Formula 1,
    Ar is a C6 to C20 aryl group;
    n1 is an integer ranging from 5 to 19;
    the Rs are the same or different and are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50 cycloalkyl group, a substituted or unsubstituted C3 to C50 cycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof; and
    at least one R is a substituted or unsubstituted C2 to C50 alkenyl group.

2. The separator as claimed in claim 1, wherein the compound represented by Chemical Formula 1 is a compound represented by Chemical Formula 1a:

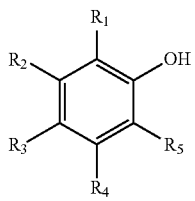

[Chemical Formula 1a]

wherein, in Chemical Formula 1a,
$R_1$ to $R_5$ are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50 cycloalkyl group, a substituted or unsubstituted C3 to C50 cycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof, and
at least one of $R_1$ to $R_5$ is a substituted or unsubstituted C2 to C50 alkenyl group.

3. The separator as claimed in claim 2, wherein at least one of $R_1$ to $R_5$ of Chemical Formula 1a is a hydroxy group.

4. The separator as claimed in claim 3, wherein $R_1$ of Chemical Formula 1a is a hydroxy group.

5. The separator as claimed in claim 4, wherein $R_5$ of Chemical Formula 1 a is a substituted or unsubstituted C2 to C50 alkenyl group.

6. The separator as claimed in claim 1, wherein:
the heat-resistant layer includes the cross-linked product of the compound represented by Chemical Formula 1, and
the cross-linked product of the compound represented by Chemical Formula 1 has a weight average molecular weight of about 1,000 g/mol to about 50,000 g/mol.

7. The separator as claimed in claim 1, wherein the heat-resistant layer further includes at least one of a cross-linkable compound differing from the compound represented by Chemical Formula 1 and a non-cross-linkable compound.

8. The separator as claimed in claim 1, wherein the heat-resistant layer further includes polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, a polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxymethyl cellulose, an acrylonitrile-styrene-butadiene copolymer, or a combination thereof.

9. The separator as claimed in claim 1, wherein the heat-resistant layer further includes an inorganic filler, an organic filler, an organic/inorganic filler, or a combination thereof.

10. The separator as claimed in claim 9, wherein:
the heat-resistant layer includes the inorganic filler, and
the inorganic filler is or includes a metal oxide, a semimetal oxide, a metal fluoride, a metal hydroxide, or a combination thereof.

11. The separator as claimed in claim 9, wherein:
the heat-resistant layer includes the organic filler, and
the organic filler is or includes an acrylic compound, an imide compound, an amide compound, or a combination thereof.

12. The separator as claimed in claim 9, wherein:
the heat-resistant layer includes the inorganic filler, and
the inorganic filler is or includes $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, $Mg_3(OH)_2Si_4O_{10}$, or a combination thereof.

13. The separator as claimed in claim 1, wherein the porous substrate includes a polyolefin.

14. The separator as claimed in claim 1, wherein the porous substrate includes a single layer or two or more layers.

15. A rechargeable lithium battery, comprising
a positive electrode,
a negative electrode, and
a separator as claimed in claim 1 between the positive electrode and the negative electrode.

16. A separator for a rechargeable battery, the separator comprising:
a porous substrate, and
a heat-resistant layer on at least one surface of the porous substrate
wherein the heat-resistant layer includes a compound represented by Chemical Formula 1a or a cross-linked product thereof:

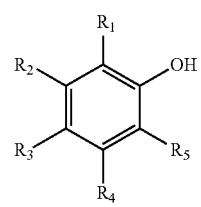

[Chemical Formula 1a]

wherein, in Chemical Formula 1a,
$R_1$ is a hydroxy group,
$R_5$ is a substituted or unsubstituted C2 to C50 alkenyl group, and
$R_2$ to $R_4$ are independently hydrogen, a substituted or unsubstituted C1 to C50 alkyl group, a substituted or unsubstituted C2 to C50 alkenyl group, a substituted or unsubstituted C2 to C50 alkynyl group, a substituted or unsubstituted C3 to C50 cycloalkyl group, a substituted or unsubstituted C3 to C50 ycloalkenyl group, a substituted or unsubstituted C3 to C50 cycloalkynyl group, a substituted or unsubstituted C1 to C50 alkoxy group, a substituted or unsubstituted C6 to C30 aryl group, a substituted or unsubstituted C3 to C30 heterocyclic group, a halogen atom, a hydroxy group, a cyano group, or a combination thereof.

* * * * *